G. J. BUCKEY.
PLOWSHARE.
APPLICATION FILED JUNE 3, 1909.

949,617.

Patented Feb. 15, 1910.

Witnesses
Phil E. Barnus
J. J. Sheehy Jr.

Inventor
George J. Buckey
James Sheehy Attorney

UNITED STATES PATENT OFFICE.

GEORGE J. BUCKEY, OF HANOVER, PENNSYLVANIA.

PLOWSHARE.

949,617. Specification of Letters Patent. Patented Feb. 15, 1910.

Application filed June 3, 1909. Serial No. 499,967.

*To all whom it may concern:*

Be it known that I, GEORGE J. BUCKEY, citizen of the United States, residing at Hanover, in the county of York and State of Pennsylvania, have invented new and useful Improvements in Plowshares, of which the following is a specification.

My invention pertains to plow shares; and it has for its object to provide a plow share the point portion of which is constructed in such a manner that its strength is increased and it is enabled by engaging the land side of a furrow and the underside of the lifted soil to hold itself rigidly to its work and a plow, as a whole, against casual upward movement.

Figure 1:
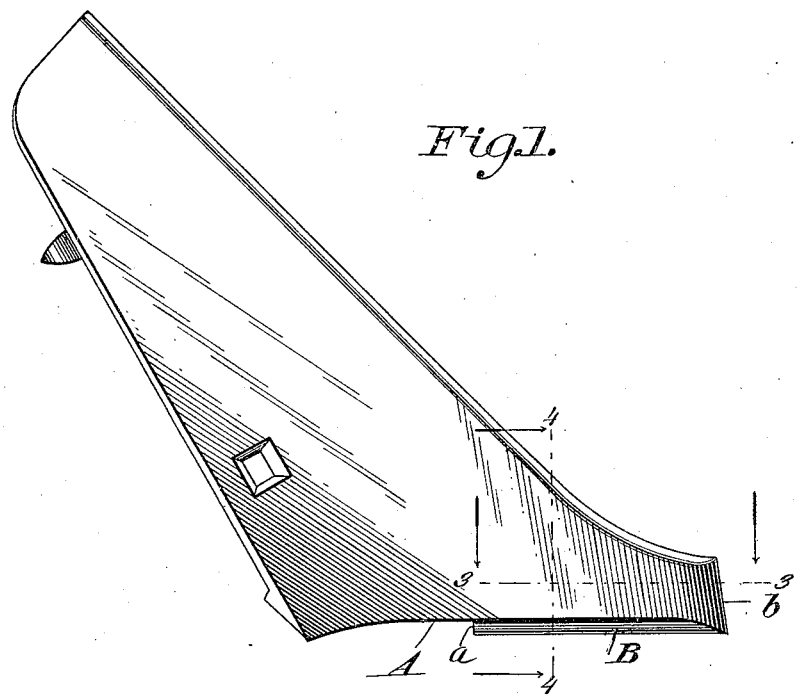
Figure 2:
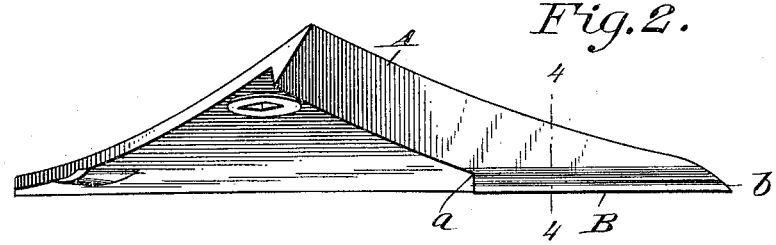
Figure 3:
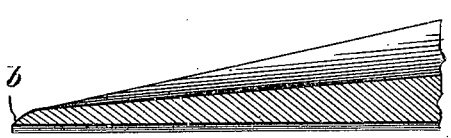
Figure 4:
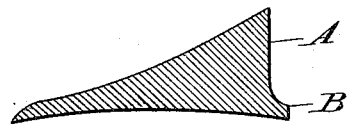

With the foregoing in view, the invention will be fully understood from the following description and claim when the same are read in connection with the drawings, accompanying and forming part of this specification, in which:

Figure 1 is a plan view showing in its working position a left-hand plow share constructed in accordance with my invention. Fig. 2 is a side elevation showing in its working position the land-side edge of the share. Fig. 3 is an enlarged, longitudinal vertical section taken in the plane indicated by the line 3—3 of Fig. 1. Fig. 4 is an enlarged transverse section taken in the plane indicated by the line 4—4 of Figs. 1 and 2.

Similar letters of reference designate corresponding parts in all of the views of the drawings.

My novel plow share is provided with a vertical land-side edge A which is curved downwardly and forwardly from its rear end, and from an intermediate point $a$ of its length to the forward end of the point $b$ of the share is tapered or gradually reduced in height. On the lower and forward portion of said land-side edge A and extending horizontally from the intermediate point $a$ to the forward end $b$ is a rib B which, in addition to lending increased strength to the point portion of the share, is calculated to move along in the land-side of a furrow and in that way tend to hold the share rigidly to its work and a plow, as a whole, against casual upward movement. The said rib B is transversely inclined downwardly and outwardly from the land-side edge A, as clearly appears in Fig. 4, this being advantageous because it contributes to the facility with which the share can be made, and also because it enables the rib by engaging the earth below and beyond the land-side of the furrow to better perform the function ascribed to it.

As will be seen by reference to Fig. 1, the forward end $b$ of the share extends at an approximate right angle to the land-side edge A, and by comparison of Figs. 1, 2 and 3, it will be observed that the upper side of the forward portion of the share is beveled to the said end $b$, whereby the latter is enabled to easily cut through the earth. In length the said forward end $b$ is proportioned approximately as illustrated, and from this it follows that the share has a broad point portion which by bearing against the soil as it takes under the same, is adapted to assist the rib B in holding the share rigidly to its work and a plow, embodying the share, against upward movement. Attention is also here directed to the fact that the rib B extends clear to the forward end $b$ and in that way strengthens the point portion of the share.

Notwithstanding the advantages hereinbefore pointed out as peculiar to my novel share, it will be noted that the share can be manufactured quite as easily as an ordinary share and hence is no more costly than the latter.

Having described my invention, what I claim and desire to secure by Letters-Patent, is:

A plow share having a vertical land-side edge that is curved from the rear downwardly to an intermediate point of its length and from there is horizontally projected to the front end of the point, and also having the point extending at a right angle to the land-side edge and beveled forwardly, and further having a horizontal rib that extends downwardly and outwardly from the lower portion of the land-side edge, between the said intermediate point and the front end of the share point, and is beveled at its forward end.

In testimony whereof I have hereunto set my hand in presence of two subscribing witnesses.

GEORGE J. BUCKEY.

Witnesses:
WM. LIST,
F. A. BEYER.